Figure 2:
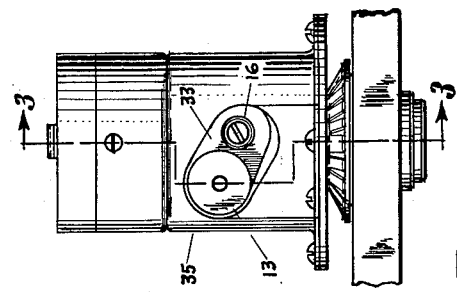

June 2, 1964     I. J. FINK     3,135,074

TWIST DRILL GRINDING DEVICES

Filed Sept. 8, 1961     3 Sheets-Sheet 1

INVENTOR.
ISRAEL J. FINK
BY
George A. Schwenzer
ATTORNEY-

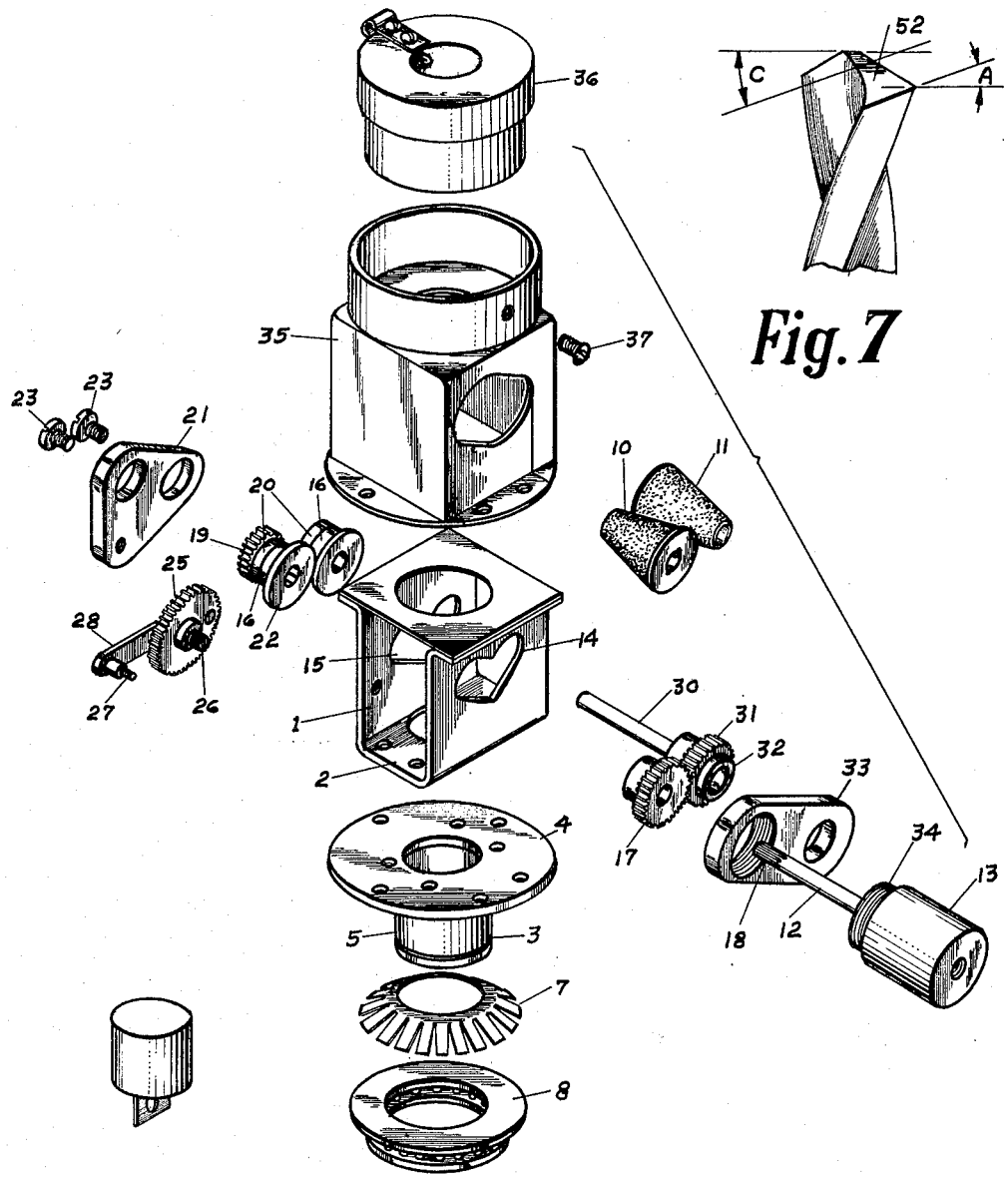

June 2, 1964        I. J. FINK        3,135,074

TWIST DRILL GRINDING DEVICES

Filed Sept. 8, 1961        3 Sheets-Sheet 3

INVENTOR.
ISRAEL J. FINK

BY George A. Schwenzer

ATTORNEY-

United States Patent Office 3,135,074
Patented June 2, 1964

3,135,074
TWIST DRILL GRINDING DEVICES
Israel J. Fink, Cincinnati, Ohio; George A. Schwenzer, commissioner of said Israel J. Fink, deceased, assignor to Blanche E. Fink
Filed Sept. 8, 1961, Ser. No. 136,822
10 Claims. (Cl. 51—241)

My present invention relates to automatic twist drill grinding and more particularly to the accurate grinding of twist drills set up in singular or multiple arrangement.

Twist drills used for drilling holes in metals and other materials must be ground properly in order that maximum efficiency and good clean true holes can be obtained. Hand grinding of drills requires expert skill and rarely produces a uniform clearance behind the cutting edges of the twist drills. Complicated machines have been made but these are usually expensive and their use is therefore limited. These machines require that the drills be removed from the drill chucks and taken to the grinder apparatus at another location away from the drilling operation. When multiple drills are used to operate simultaneously their regrinding necessitates shut down, removal from the drill chuck, regrinding and resetting to the work to be drilled. This is time consuming and in mass production results in decreased production. The inherent problem of drill grinding is complicated by the necessity of providing a uniform clearance behind the cutting edges from its outer cutting edge and sloping towards the vertical axis of the drill. Too much clearance weakens the cutting edge and not enough clearance prevents proper or no cutting of the material being drilled. To properly grind drills by hand they must be manipulated properly on a grind stone to obtain the proper clearance behind the cutting edges. Machines for grinding drills requires that the drills be positioned and clamped before the grinding of the drills. In each case an operator with experience must perform the grinding of the drill. With my invention it is not necessary to remove a drill from the drill chuck between grinding operations. No experienced operator is necessary with my device since it is completely automatic.

It is an object of my invention to provide an automatic drill grinder that will provide proper and uniform clearance for the cutting edges of a dull twist drill without removing the twist drill from a drill press chuck.

Another object of my invention is to provide an automatic drill grinding device that can grind a drill or a multiple of drills secured in a chuck or a multiple drill chuck without removing the drills from their operating position in relation to a piece of material being drilled.

A further object of my invention is to provide a drill grinder that will grind the drills and automatically shape the lands and heels of a drill to provide a uniform cutting edge with proper clearance without removing the drill from a drill chuck on a drill press.

A final object of my invention is to provide a drill grinder for drills clamped in drill chucks of a drill press that is actuated automatically by a timing device and functions after a predetermined number of drilling operations to maintain the cutting edges of the drill or drills in the maximum keenest cutting condition.

These and further additional objects will become apparent from the description and the drawings illustrating a preferred embodiment of my invention.

Figure 1:
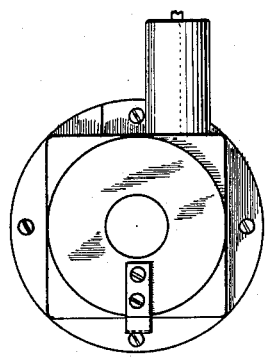
Figure 3:
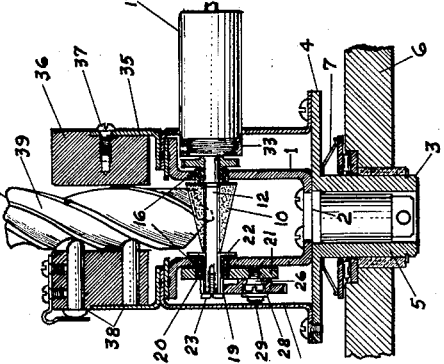
Figure 5:
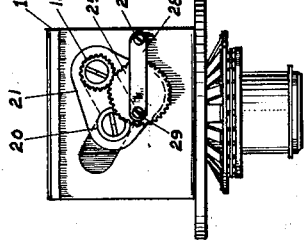
Figure 4:
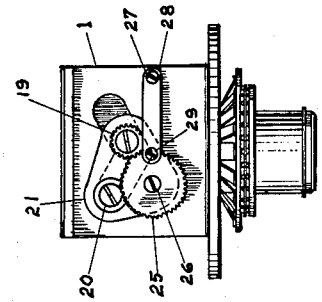
Figure 8:
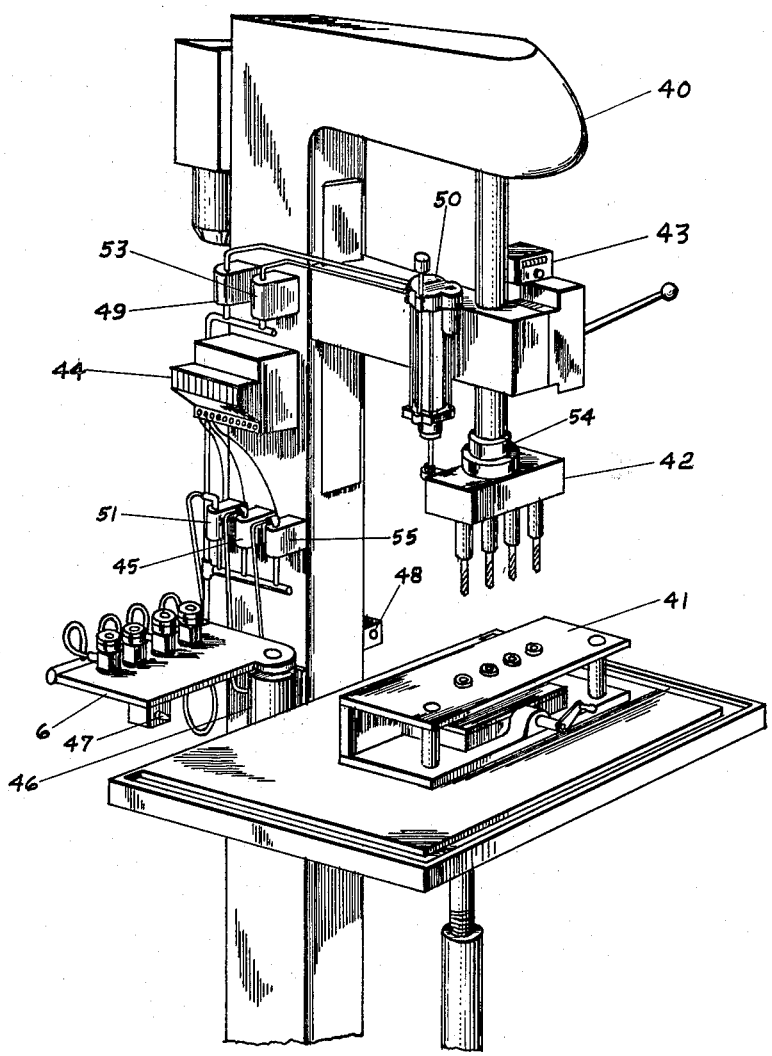

FIGURE 1 is a top plan view of my drill grinder.
FIGURE 2 is a right side elevation of my drill grinder.
FIGURE 3 is a section in elevation taken on line 3—3 of FIGURE 2.
FIGURE 4 is a partial left side elevation of my drill grinder after removal of a housing and illustrating extreme left hand movement of my grinding wheels.
FIGURE 5 is a partial left side elevation of my grinder after removal of a housing and illustrating extreme right hand movement of my grinding wheels.
FIGURE 6 is an exploded view showing the parts of my grinder in perspective.
FIGURE 7 is a side view of a fragment of a twist drill in elevation.
FIGURE 8 is a perspective view showing my drill grinder mounted on a drill press.

Referring to FIGURES 3 and 6 wherein I have illustrated a preferred embodiment of my invention there is a U frame 1 with a base 2 having clearance holes for screws to secure it to a rotatable swivel support 3. The swivel support has an enlarged flange 4 with tapped holes for securing it to the bottom of the frame. A hollow elongated sleeve 5 of the swivel support is rotatably mounted in a bushinged hole in a swinging table 6. Between the bottom of the flange 4 and the top of the swinging table there is a compression spring 7 supported on a rotatable thrust bearing 8 surrounding the sleeve. The compression spring reacts against the downward thrust of a drill 9 when it is put into contact with truncated grinding cones 10 and 11 preparatory to a grinding operation. There are two of the grinding cones with the larger diameters and apexes pointing in opposite directions. One of the grinding cones is keyed to and rotated by a shaft 12 that is rotatably driven by a fluid actuated motor 13. It is not intended to limit the shaft driving means to fluid or electrical motors. In cases where a multiple of my grinding units will have to be placed in relation to close centered gang drills flexible shafts are connected between the shafts and the motor. The flexible drives are small in diameter and allow the grinding units to be placed closer together without interference by the size of the motors. The U frame has V shaped cam slots 14 and 15 one on each side of the U frame for rotatably retaining ball or roller bearings 16 that is fixed on the shaft 12. These cam slots guide the grinding cones and allow them to rise and descend about and in relation to a drill point and the axis of the drill during grinding. A gear 17 secured on the shaft 12 along side of one of the roller bearings 16. An end of the shaft 12 has a spline 18 for securing a flanged rotatable bearing to it. Another gear 19 is fixed on the flanged bearing that is rotatable with and by shaft 12. Secured on the flanged bearing is another roller bearing 20 and this bearing secures the shafts rotatably in a rocker arm 21. The rocker arm rotatably supports the grinding cones as they rise and descend in relation to the axis of the drill as directed by the cam slots. The flanged rotatable bearings 22, together with screws 23 retain the gears and rocker arm in rotatable position within the cam slot 15 and on the U frame. Another gear 19 is in mesh with and rotates a gear 25 that is rotatably mounted on a bearing stud 26 that is fixed in the rocker arm. Fixed in the side of the U frame is a bearing stud 27 upon which is rotatably mounted one end of a link 28. Another end of the link connects to the gear 25 and is rotatably mounted on a stud 29 fixed in the gear 25 but eccentric to the stud 26. The rotation of the link on the studs 27 and 29 causes the rocker arm to oscillate back and forth across the vertical center of the drill and the grinding stones to rise and descend in relation to the vertical axis of the drill according to the cam slot outlines. On a shaft 30 there is fixed another gear 31 that meshes with and is driven by the gear 17. The gear 31 has a hub 32 that is rotatably mounted in a link 33 that in turn is non rotatably mounted on a hub bearing 34 secured to the motor. This link, in conjunction with the rocker arm, imparts uniform parallel movement of the grinding cones according to the cam slots. The grinding cones are secured to and driven by the shafts 12 and 30 and the grinding cones rotate each towards the other. All of the gears are rotated and moved up and down within the cam slots. Surrounding the U frame is a housing 35 that is secured to the swivel 4 and rotatable with it. Slidably mounted within the housing are guide bushings 36 that are held in position in the housing by means of set screws 37. Bushings for different sizes are interchangeable and each of the grinding units are utilized for various sizes of drills. Within the bushings there are locator pins adapted to protrude and engage in flutes 39 of the drill to position the drill in proper relation to the grinding cones.

In FIGURE 8 there is illustrated the application of my invention to a multiple drilling operation on a drill press 40. Secured on the drill press is a jig 41 for a piece of work requiring four holes. A multiple drill head 42 has four twist drills secured therein. A counter 43 is secured on the column of the drill press and registers the number of times the spindle has descended and drilled holes. After a given number of drillings the counter will actuate a multiflex timer 44 through a series of operations. The first operation disengages the feed and stops the rotation of the drills up and out of the piece being drilled. Next the multiple timer opens an air valve 45 admitting air into a rotary torque actuator 46 that is rotatably linked to and rotates the swinging table 6 with my grinders to place them beneath and in line with the twist drills. The air connections to the motors are flexible and of sufficient length to permit free swinging of the table. When flexible shafts are used they too are of sufficient length so that they will not interfere with the swing of the table. At the front of the table is a tapered dowel pin 47 that seats into a locating socket 48 to insure proper alignment of the grinders with the drills. The timer then opens another air valve 49 which actuates a hydro check air cylinder 50 that pushes the drills down and in contact with the grinding cones. Simultaneously when the drills are descending to contact the grinding cones another air valve 51 opens and actuates the motors that drive the grinding cones. The drills, during the grinding, move downward and move through a partial rotation by the action of the locator pins while the grinding cones are grinding and rising and descending by the action of the cam slots. As the drills descend the pins in the flutes will rotate the drills enough to impart the proper angles A and C on the heel 52 to insure the proper rake behind the cutting edge. The housing with the grinders will also rotate about the vertical axis of the drill due to the action of the locator pins. After the grinding cones have rotated a predetermined number of times an air valve 53 opens and actuates the hydrocheck air cylinder which withdraws the drills and pulls the drills to up position 54. Simultaneously air to the grinder motors is shut off and the motors come to rest while an air valve 55 is opened and reverses the torque actuator. The actuator swings the swinging table back away from the drills to the position shown in FIGURE 8. The resharpened drills are now in condition and the drilling operation can be continued without the drills being removed from the drill chucks in the drill press.

Having thus described my invention I claim:

1. A twist drill grinding device having motor driven inverted end for end conical grinding means adjacent each to the other on parallel shafts, said grinding means and shafts arranged to be tilted upward and downward about a central vertical axis perpendicular to the axis of said grinding means while grinding said twist drills, said conical grinding means rotatable towards each to the other.

2. A motor driven twist drill grinding device, having gear driven shafts maintained in parallel alignment and tiltable about an axis perpendicular to the axis of said shafts while rotating said shafts, conical grinding means inverted end for end each to the other secured to said shafts and rotatable and tiltable with said shafts to grind the ends of twist drills positioned on said axis perpendicular to said shafts and coinciding to a perpendicular axis perpendicular to a center line intermediate of the axis of said shafts.

3. A motor driven twist drill grinding device comprising an extended floating motor shaft with a gear fixed thereon, another floating shaft in fixed center parallel alignment with said floating motor shaft and movable with said motor shaft during rotation of said motor shaft by said motor, said other floating shaft having a gear fixed thereon and driven by said motor shaft, inverted cone shaped grinding means secured on said shafts adapted to move in a pendulous manner in relation to a drill axis perpendicular to a horizontal axis of said shafts during rotation of said shafts, a housing having cam slots rotatably supporting said shafts to move said shafts in a pendulous manner about said drill axis.

4. A motor driven twist drill grinding device comprising an extended motor shaft with a gear fixed thereon, another shaft in parallel alignment having a gear fixed thereon and driven by said motor shaft, grinding means secured on said shaft adapted to move upward and outward in relation to a drill axis perpendicular to a longitudinal axis of said shafts, a housing having cam slots for rotatably supporting said shafts while said shafts move upwardly and outwardly from said drill axis, a rocker arm tiltably supported in relation to said housing and rotatably supporting in parallel alignment said shafts to actuate and move said shafts in parallel alignment upward away from and downward to said drill axis, a gear rotatably supporting said rocker arm rotated by a gear on the end of said extended shaft, and a link rotatably connected to said gear and said housing, said link adapted to tilt said rocker arm upon rotation of said gear by said motor shaft.

5. A motor driven twist drill grinding device comprising an extended motor shaft with a gear fixed thereon, another shaft in parallel alignment having a gear fixed thereon and driven by said motor shaft, grinding means secured on said shaft adapted to move upward and outward in relation to a drill axis perpendicular to a horizontal axis of said shaft, a housing having a cam slot for rotatably supporting and guiding said shaft while said shaft moves upwardly and outwardly away from said drill axis, a rocker arm tiltable supported on said housing rotatably supporting said shaft to actuate and move said shaft according to the cam slot, a gear rotatably supported on said housing and fixed to said rocker arm, and a link rotatably connected to said gear and said housing and said gear adapted to tilt said rocker arm upon rotation of said motor shaft, and actuate said grinding means alternately upward and outward about the axis of said drill.

6. A grinding device for a drill comprising truncated conical rotatable grinding wheels, said grinding wheels secured to shafts rotatable in floating rocker arms, one of said shafts being an extension of a motor shaft and said motor and shaft being supported on said rocker arm and movable therewith while said motor rotates said shaft, internal V cam means to rotatably support said grinding wheel shafts and to pendulate one of said grinding wheels about a vertical axis of said drill and simultaneously pendulate one of said grinding wheels downward and toward the vertical axis of said drill while grinding said drill and crank means to actuate said rocker arms and shafts in conformity with said V cam means while grinding said drill.

7. A grinding device for a drill comprising a frame with spaced grinding wheels parallel each to the other rotatable within the housing and on opposite sides of a vertical axis of said drill during grinding of said drill, a motor fixed on a floating rocker arm for driving said grinding wheels fixed on rotatable shafts movable within slots in said housing and rotatably retained on said floating rocker arm tiltably supported on said housing and means to tilt said rocker arm in relation to said housing and cause said grinding wheels to rise and descend about heels of said drill to produce angular clearance to a cutting edge of said drill while said motor drives said grinding wheels.

8. A grinding device for a drill comprising a frame with spaced grinding wheels parallel each to the other rotatable within the housing and on opposite sides of a vertical axis of said drill during grinding of said drill, said grinding wheels supported and movable within slots in said housing and rotatably retained on a rocker arm tiltably supported on said housing and means to tilt said rocker arm in relation to said housing and cause said grinding wheels to rise and descend about heels of said drill to produce angular clearance to a cutting edge of said drill, and driving means supporting and rotating said grinding wheels to actuate said rocker arm.

9. A grinding device for grinding a twist drill secured in a spindle of a drilling machine in combination with a timer and a hydraulic means comprising a motor for driving inverted end for end conical driving wheels secured on shafts driven by said motor, said shafts rotatably mounted on floating rocker arms and said shafts movably retained in V cam slots on a housing supporting said shafts and rocker arms, crank means actuated by said motor to oscillate said rocker arms and grinding wheels about a vertical axis of said twist drill, said housing secured to a hinged platen actuated by a hydraulic cylinder to move said grinding device to and from alignment to said vertical axis of said twist drill, a counter adjacent to said spindle to record the number of times the drill has descended and risen to and from a drilling operation, said counter arranged to actuate an hydraulic timer through a series of operation after a predetermined number of drillings operations of the drill, said timer arranged to disengage power from said spindle to stop the rotation of said drill, actuate said hydraulic cylinder, actuating said cylinder to bring said grinding device into alignment with the axis of said twist drill secured in said spindle, actuate another hydraulic cylinder secured to said drilling machine with a piston rod of said other hydraulic cylinder secured to said spindle to move said spindle downward and place the drill in grinding position with the said grinding wheels, actuate the motors driving the grinding wheels and grind the twist drill, reactivate the other cylinder to withdraw the drill from the grinder and reengage the power to rotate the said spindle, reactivate the cylinder actuating the said platen supporting the grinder from alignment of the twist drill and present work to the sharpened twist drill.

10. A grinding device for a drill comprising truncated grinding wheels secured to parallel rotatable shafts, said truncated grinding wheels inverted end for end each to the other to form an angular grinding trough disposed at an angle to the parallel shafts, said shafts and grinding wheels adapted to move in a pendulum path about a vertical axis of a drill while said grinding wheels are rotated, cam slots within a housing for rotatably supporting said rotatable shafts, grinding wheels and the said trough between them in a pendulated path about said axis of said drill while grinding said drill.

References Cited in the file of this patent
UNITED STATES PATENTS

| | | |
|---|---|---|
| 288,069 | Landers | Nov. 6, 1883 |
| 1,042,817 | Newman | Oct. 29, 1912 |
| 2,017,532 | Elter et al. | Oct. 15, 1935 |
| 2,177,644 | Finke | Oct. 13, 1939 |
| 2,228,385 | Burns | Jan. 14, 1941 |